(12) United States Patent
Sarapin

(10) Patent No.: US 9,484,618 B2
(45) Date of Patent: Nov. 1, 2016

(54) ANTENNA CONFIGURATION FOR ELECTRONIC DEVICES

(75) Inventor: Alexander Sarapin, Westfield, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 1047 days.

(21) Appl. No.: 12/733,820

(22) PCT Filed: Oct. 17, 2007

(86) PCT No.: PCT/US2007/022169
§ 371 (c)(1),
(2), (4) Date: Mar. 22, 2010

(87) PCT Pub. No.: WO2009/051584
PCT Pub. Date: Apr. 23, 2009

(65) Prior Publication Data
US 2010/0194649 A1    Aug. 5, 2010

(51) Int. Cl.
*H01Q 1/24* (2006.01)
*H01Q 9/04* (2006.01)
*C08F 10/00* (2006.01)
(Continued)

(52) U.S. Cl.
CPC .............. *H01Q 1/243* (2013.01); *C08F 10/00* (2013.01); *C08F 10/06* (2013.01); *H01Q 9/0442* (2013.01); *C08F 4/65912* (2013.01); *C08F 4/65925* (2013.01); *C08F 4/65927* (2013.01); *C08F 210/06* (2013.01); *C08F 210/16* (2013.01);
(Continued)

(58) Field of Classification Search
CPC ... H01Q 1/243; H01Q 9/0421; H01Q 9/0442

USPC .......... 343/700 MS, 702, 745, 846, 850, 860
See application file for complete search history.

(56) References Cited

U.S. PATENT DOCUMENTS

| 4,641,146 A | 2/1987 | Gehman |
| 4,835,542 A | 5/1989 | Sikina, Jr. |

(Continued)

FOREIGN PATENT DOCUMENTS

| GB | 680512 | 10/1952 |
| JP | 10-16646 | 1/1998 |

(Continued)

OTHER PUBLICATIONS

Search Report Dated, Jun. 11, 2008.

*Primary Examiner* — Michael C Wimer
(74) *Attorney, Agent, or Firm* — Brian J. Dorini; Robert D. Shedd

(57) ABSTRACT

An antenna configuration is particularly suitable for use within a front panel assembly of an electronic device, such as a set-top box. According to an exemplary embodiment, the electronic device includes a chassis, a printed circuit board and an F-shaped antenna. The printed circuit board includes a ground portion and a dielectric portion. The ground portion is electrically coupled to the chassis. The F-shaped antenna includes a first portion, a second portion and a third portion. The first portion of the F-shaped antenna extends along the dielectric portion of the printed circuit board. The second portion of the F-shaped antenna is electrically coupled to the ground portion of the printed circuit board. The third portion of the F-shaped antenna extends between the ground portion and the dielectric portion of the printed circuit board and is electrically coupled to a signal processor via a reactive element (jX1, Jx2).

7 Claims, 3 Drawing Sheets

(51) Int. Cl.
  *C08F 10/06* (2006.01)
  *C08F 4/659* (2006.01)
  *C08F 4/6592* (2006.01)
  *C08F 210/06* (2006.01)
  *C08F 210/16* (2006.01)

(52) U.S. Cl.
  CPC .......... *H01Q 9/0421* (2013.01); *Y10S 526/943* (2013.01)

(56) References Cited

U.S. PATENT DOCUMENTS

| | | | |
|---|---|---|---|
| 6,239,765 B1 | 5/2001 | Johnson et al. | |
| 6,281,857 B1 | 8/2001 | Dobrovolny | |
| 6,342,860 B1 | 1/2002 | Haussler et al. | |
| 6,980,158 B2 * | 12/2005 | Iguchi et al. | 343/702 |
| 7,006,794 B1 | 2/2006 | Lockie et al. | |
| 7,102,577 B2 * | 9/2006 | Richard et al. | 343/702 |
| 7,177,369 B2 | 2/2007 | Crilly, Jr. | |
| 7,242,364 B2 * | 7/2007 | Ranta | 343/860 |
| 7,259,720 B2 * | 8/2007 | Ryu | 343/700 MS |
| 7,876,274 B2 * | 1/2011 | Hobson et al. | 343/702 |
| 2002/0159537 A1 | 10/2002 | Crilly, Jr. | |
| 2003/0052827 A1 | 3/2003 | Umehara et al. | |
| 2004/0130493 A1 | 7/2004 | Horita et al. | |
| 2004/0196813 A1 | 10/2004 | Ofek et al. | |
| 2004/0207557 A1 | 10/2004 | Chen et al. | |
| 2004/0222922 A1 | 11/2004 | Kuo et al. | |
| 2005/0168384 A1 | 8/2005 | Wang et al. | |
| 2006/0012482 A1 | 1/2006 | Zalud et al. | |
| 2006/0017635 A1 | 1/2006 | Zheng | |
| 2007/0042715 A1 | 2/2007 | Salo et al. | |
| 2007/0268191 A1 | 11/2007 | Ishizuka et al. | |

FOREIGN PATENT DOCUMENTS

| | | |
|---|---|---|
| JP | 10-200327 | 7/1998 |
| JP | 2001077612 | 3/2001 |
| JP | 2002-353716 | 12/2002 |
| JP | 2003-92510 | 3/2003 |
| JP | 2004320706 | 11/2004 |
| KR | 20010020104 | 3/2001 |
| NL | 80176 | 1/1956 |
| WO | WO0141253 | 6/2001 |
| WO | WO0158175 | 8/2001 |
| WO | WO03007510 | 1/2003 |
| WO | WO03096474 | 11/2003 |
| WO | WO2004093315 | 10/2004 |
| WO | WO2006039699 | 4/2006 |
| WO | WO2006080141 | 8/2006 |
| WO | WO2007012109 | 2/2007 |
| WO | WO2007024805 | 3/2007 |

\* cited by examiner

ANTENNA CONFIGURATION FOR ELECTRONIC DEVICES

This application claims the benefit under 35 U.S.C. §365 of International Application PCT/US2007/002,169, filed Oct. 17, 2007, which was published in accordance with PCT article 21(2) on Apr. 24, 2009 in English.

BACKGROUND OF THE INVENTION

1. Field of the Invention

The present invention generally relates to an antenna configuration, and more particularly, to an antenna configuration that is particularly suitable for use within a front panel assembly of an electronic device.

2. Background Information

Electronic devices such as televisions, set-top boxes and the like often include some form of antenna that enables the reception of signals from a remote signal source such as a hand-held remote control device. To provide an antenna for such devices in an aesthetically pleasing manner, it is often desirable to integrate the antenna as part of the device's front panel assembly (FPA).

Due to space constraints, conventional designs seeking to integrate an antenna as part of a device's FPA often implement the antenna as a printed trace contained on a printed circuit board. With such designs, the antenna may for example be configured as a printed monopole or as a loop antenna. Such conventional designs, however, are not suitable for certain applications since the printed trace antenna may be located too close to the device chassis. In particular, the proximity of a reflecting surface such as a chassis to a printed trace antenna can significantly reduce antenna efficiency by dramatically shrinking its operational range. Even small changes in distance between a printed trace antenna and a chassis can affect antenna performance.

Other classes of miniature low profile antennas include an L-shaped antenna and an F-shaped antenna. Examples of an L-shaped antenna and an F-shaped antenna are shown in FIGS. 1 and 2, respectively. As shown in FIGS. 1 and 2, an L-shaped antenna and an F-shaped antenna both include a horizontal portion 10 and one or more vertical portions 12 having an end 14 representing a driving point for signal reception. While L-shaped and F-shaped antennas both generally have inherently low impedance, the antennas as shown in FIGS. 1 and 2 are not necessarily suitable for use within a FPA of an electronic device. For example, the FPA environment of an electronic device often has signal traces and ground polygons which can adversely affect antenna performance.

Accordingly, there is a need for an antenna configuration for electronic devices that overcomes the above-mentioned problems, and is particularly suitable for use within a FPA of an electronic device. The present invention described herein addresses these and/or other issues.

SUMMARY OF THE INVENTION

In accordance with an aspect of the present invention, an electronic device is disclosed. According to an exemplary embodiment, the electronic device comprises a chassis and means such as a printed circuit board having a ground portion and a dielectric portion. The ground portion of the printed circuit board is electrically coupled to the chassis. The electronic device further comprises means such as an F-shaped antenna having a first portion, a second portion and a third portion. The first portion of the F-shaped antenna extends along the dielectric portion of the printed circuit board. The second portion of the F-shaped antenna is electrically coupled to the ground portion of the printed circuit board. The third portion of the F-shaped antenna extends between the ground portion and the dielectric portion of the printed circuit board and is electrically coupled to a signal processor via a reactive element.

In accordance with another aspect of the present invention, a method for providing an electronic device is disclosed. According to an exemplary embodiment, the method comprises steps of: providing a chassis; providing a printed circuit board having a ground portion and a dielectric portion, the ground portion being electrically coupled to the chassis; and providing an F-shaped antenna having a first portion, a second portion and a third portion, wherein the first portion extends along the dielectric portion of the printed circuit board, the second portion is electrically coupled to the ground portion of the printed circuit board, and the third portion extends between the ground portion and the dielectric portion of the printed circuit board and is electrically coupled to a signal processor via a reactive element.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
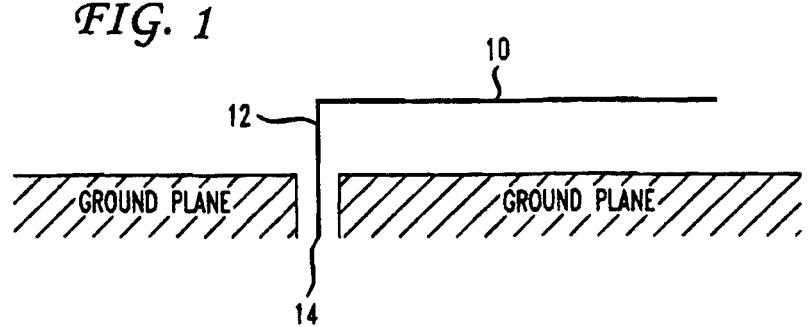
FIG. 1 is a diagram showing a conventional L-shaped antenna.
Figure 2:
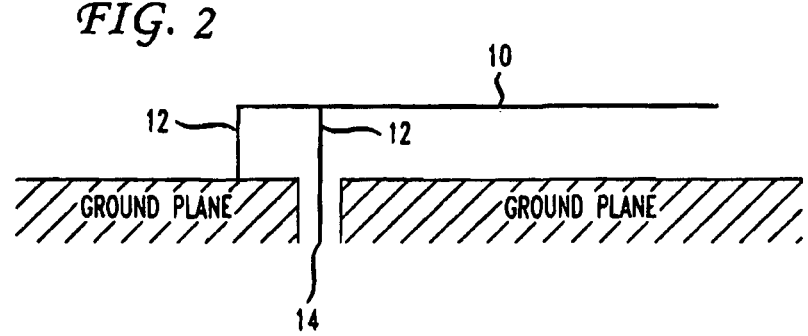
FIG. 2 is a diagram showing a conventional F-shaped antenna.
Figure 3:
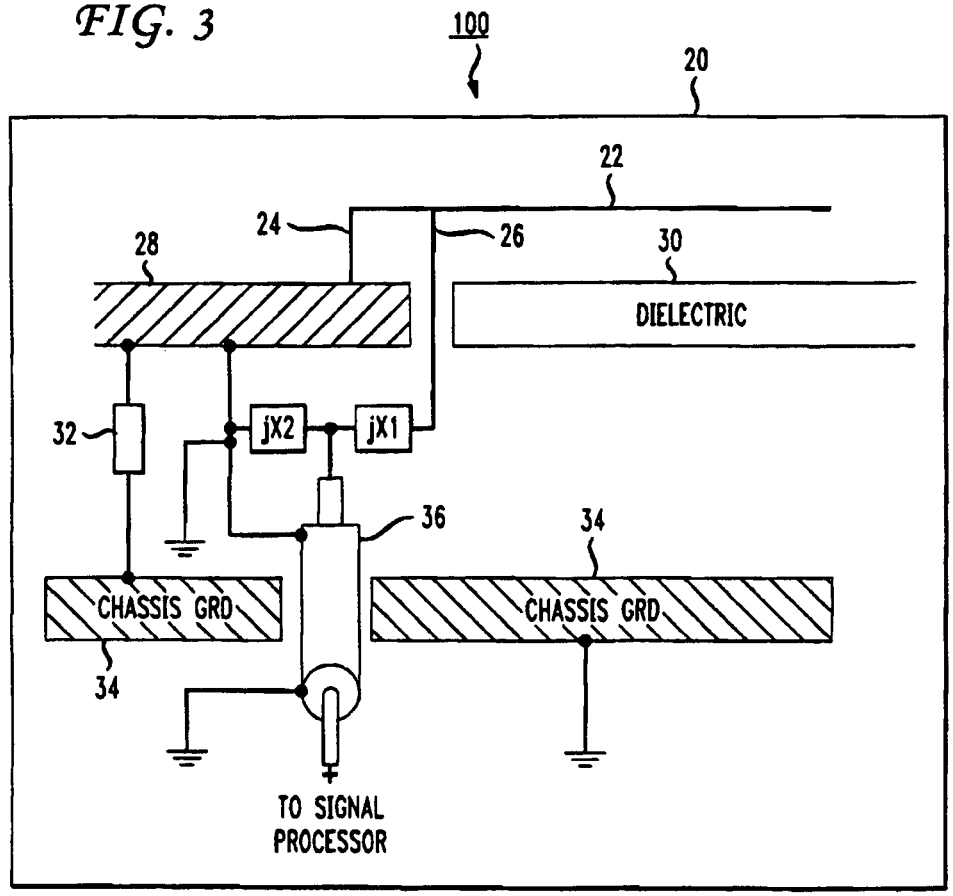
FIG. 3 is a diagram showing a relevant portion of an electronic device according to an exemplary embodiment of the present invention.

Referring now to the drawings, and more particularly to FIG. 3, a diagram showing a relevant portion of an electronic device 100 according to an exemplary embodiment of the present invention is provided. In particular, the portion of electronic device 100 shown in FIG. 3 represents an antenna configuration that may be included as part of a FPA of electronic device 100. As indicated in FIG. 3, electronic device 100 comprises a housing 20; an F-shaped antenna having a first portion 22, a second portion 24 and a third portion 26; a printed circuit board having a ground portion 28 and a dielectric portion 30; an electrical coupler 32; a chassis 34; a cable coupler 36; and reactive elements jX1 and jX2.

As shown in FIG. 3, the various elements of the antenna configuration are contained within housing 20 of electronic device 100, and therefore are not readily visible by users. In this manner, the antenna configuration of FIG. 3 may be integrated into electronic device 100 as part of its FPA in an aesthetically pleasing manner. According to an exemplary embodiment, electronic device 100 is embodied as a satellite set-top box. However, it will be intuitive to those skilled in the art that the antenna configuration of FIG. 3 may also be used in other types of electronic devices.

In FIG. 3, first portion 22 of the F-shaped antenna extends along dielectric portion 30 of the printed circuit board such that first portion 22 of the F-shaped antenna is substantially parallel to dielectric portion 30 of the printed circuit board. The physical spacing between first portion 22 of the F-shaped antenna and dielectric portion 30 of the printed circuit board may be selected as a matter of design choice based on the particular application.

Second portion 24 of the F-shaped antenna is electrically coupled to ground portion 28 of the printed circuit board. In this manner, ground portion 28 of the printed circuit board serves as a reference point for the F-shaped antenna. Ground portion 28 of the printed circuit board is also electrically coupled to chassis 34 via electrical coupler 32. According to an exemplary embodiment, electrical coupler 32 may be implemented as an electrical coupling element such as flat and/or coax cable having an inherent reactance to the ground plane of chassis 34. Because of the electrical connection between ground portion 28 of the printed circuit board and chassis 34 (which forms a ground plane), ground portion 28 of the printed circuit board may actually operate as an antenna and further improve the signal receiving performance of the F-shaped antenna.

Third portion 26 of the F-shaped antenna extends between ground portion 28 and dielectric portion 30 of the printed circuit board and is electrically coupled to a signal processor of electronic device 100 via reactive elements $jX1$ and $jX2$ and cable coupler 36 in the manner shown in FIG. 3. The types and values of reactive elements $jX1$ and $jX2$ may be selected as a matter of design choice based on the particular application. In general, reactive elements $jX1$ and $jX2$ may be implemented as capacitive and/or inductive elements and their values may depend on the inherent impedance of the F-shaped antenna, which in turn depends on multiple factors associated with the particular application. With the antenna configuration of FIG. 3, such factors may include the proximity between the F-shaped antenna and the ground plane of chassis 34, the physical configuration of the ground plane of chassis 34 in areas around the F-shaped antenna, the amount of electrical traces generated from the printed circuit board in areas around the F-shaped antenna, and the material used for the printed circuit board. According to one exemplary embodiment, reactive element $jX1$ is implemented as a capacitor having a value of 33 pF and reactive element $jX2$ is implemented as a capacitor having a value of 12 pF. According to another exemplary embodiment, reactive element $jX1$ is implemented as a capacitor having a value of 100 pF and reactive element $jX2$ is implemented as a capacitor having a value of 22 pF. Of course, other types of reactive elements and/or values may also be used in accordance with design choice.

Figure 4:
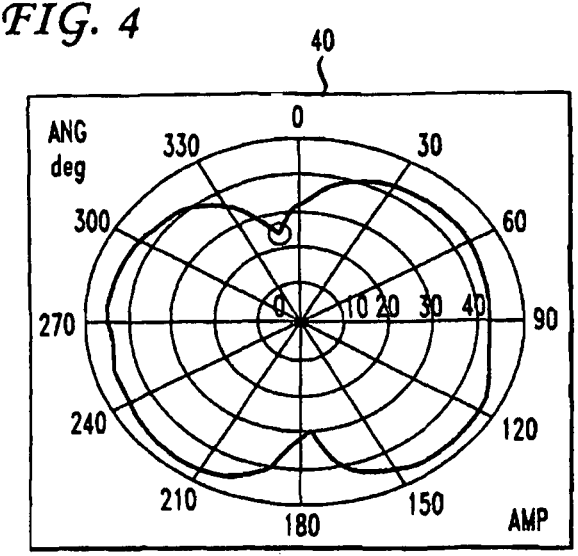
FIG. 4 is a diagram showing a radiation pattern for a conventional external whip antenna.
Figure 5:
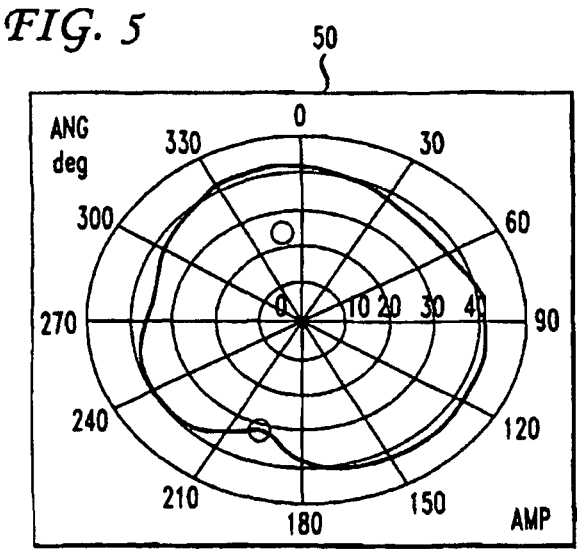
FIG. 5 is a diagram showing a radiation pattern for an antenna configuration according to an exemplary embodiment of the present invention.

In operation, the antenna configuration of FIG. 3 may be used to receive wireless signals (e.g., infrared signals, radio frequency signals, etc.) such as signals generated from a user input element (e.g., hand-held remote control device, etc.). The antenna configuration of FIG. 3 is particularly useful in this regard and is capable of providing omni-directional signal reception. The signal receiving performance of the antenna configuration of FIG. 3 can be better appreciated through FIGS. 4 and 5. In particular, FIG. 4 provides a diagram 40 showing a radiation pattern for a conventional external whip antenna (i.e., connected to the back of a device), and FIG. 5 provides a diagram 50 showing a radiation pattern for an antenna configuration according to an exemplary embodiment of the present invention. As indicated by a comparison between FIGS. 4 and 5, the antenna configuration of the present invention provides omni-directional signal reception capabilities superior to that of a conventional external whip antenna.

As described herein, the present invention provides an antenna configuration that is particularly suitable for use within a front panel assembly of an electronic device. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device, comprising:
a chassis;
a printed circuit board having a ground portion and a dielectric portion, said ground portion being electrically conductive, said dielectric portion being electrically non-conductive;
an antenna operative to receive wireless signals, said antenna having a first portion, a second portion and a third portion, said first, second and third portions electrically coupled operative to form an F-shaped antenna, said first portion having a first end and a second end, said second portion coupled in orthogonal between said second end of said first portion and said ground portion of said printed circuit board, said third portion coupled in orthogonal to said first portion at a connection point, said connection point being located in the vicinity of said second end between said first and second ends of said first portion, a longitude member of said first portion in-between said connection point and said first end extending along and above said dielectric portion of said printed circuit board in parallel with said dielectric portion of said printed circuit board, said third portion extending between said ground portion and said dielectric portion of said printed circuit board, said third portion being electrically coupled to a signal processor via a reactive element, said reactive element including first and second reactive components coupled electrically in series between said third portion of said antenna and said ground portion of said printed circuit board, said signal processor coupled between said first and second reactive components via a first coupler including a cable coupler; and
a second coupler electrically operative to couple between said ground portion of said printed circuit board and said chassis, said second coupler exhibiting an inherent reactance to said chassis so that said chassis operates as a ground plane for said antenna.

2. The device of claim 1, wherein said first reactive component electrically coupled between said third portion of said antenna and said first coupler exhibits a capacitive value of 33 pF and said second reactive component electrically coupled between said first coupler and said ground portion of said printed circuit board exhibits a capacitive value of 12 pF.

3. The device of claim 1, further comprising a housing, and wherein said chassis, said printed circuit board and said F-shaped antenna are contained within said housing.

4. The device of claim 1, wherein said first reactive component coupled between said third portion of said antenna and said first coupler exhibits a capacitive value of 100 pF and said second reactive component coupled between said first coupler and said ground portion of said printed circuit board exhibits a capacitive value of 22 pF.

5. The device of claim 1, wherein said device is a set-top box.

6. The device of claim 1, wherein said F-shaped antenna receives radio frequency signals from a user input element.

7. The device of claim 1, wherein said F-shaped antenna provides omni-directional signal reception.

* * * * *